(12) United States Patent
Gruber et al.

(10) Patent No.: US 11,342,859 B2
(45) Date of Patent: May 24, 2022

(54) APPARATUS AND METHOD FOR SUPPLYING POWER TO A HIGH-CAPACITY LOAD

(71) Applicant: SIEMENS ENERGY GLOBAL GMBH & CO. KG, Munich (DE)

(72) Inventors: Rainer Gruber, Heilsbronn (DE); Martin Pieschel, Altdorf (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/259,367

(22) PCT Filed: Jul. 10, 2018

(86) PCT No.: PCT/EP2018/068636
§ 371 (c)(1),
(2) Date: Jan. 11, 2021

(87) PCT Pub. No.: WO2020/011339
PCT Pub. Date: Jan. 16, 2020

(65) Prior Publication Data
US 2021/0305905 A1 Sep. 30, 2021

(51) Int. Cl.
*H02M 7/217* (2006.01)
*H02M 7/49* (2007.01)
(Continued)

(52) U.S. Cl.
CPC .......... *H02M 5/14* (2013.01); *H02M 1/0077* (2021.05); *H02M 5/275* (2013.01);
(Continued)

(58) Field of Classification Search
CPC ..... H02M 7/2173; H02M 7/2176; H02M 7/49
(Continued)

(56) References Cited

U.S. PATENT DOCUMENTS

| 4,459,652 A * | 7/1984 | James | H02M 7/1626 |
| | | | 363/101 |
| 5,311,419 A * | 5/1994 | Shires | H02M 7/4807 |
| | | | 363/65 |

(Continued)

FOREIGN PATENT DOCUMENTS

| EP | 2637296 A1 | 9/2013 |
| JP | 2015142467 A * | 8/2015 |

(Continued)

OTHER PUBLICATIONS

Ma Fujun et al: "A Railway Traction Power Conditioner Using Modular Multilevel; Converter and Its Control Strategy for High-Speed Railway System", IEEE Transactions on Transportation Electrification, IEEE, vol. 2, No. 1, pp. 96-109, XP011604624, DOI: 10.1109/TTE.2016.2515164; [found on Mar. 29, 2016]; Abstract; Figures 1, 2; 2016.

(Continued)

*Primary Examiner* — Gary A Nash
(74) *Attorney, Agent, or Firm* — Laurence A. Greenberg; Werner H. Stemer; Ralph E. Locher

(57) ABSTRACT

An apparatus for supplying power to a high-capacity load includes a three-to-two phase transformer including an input side three-phase transformer terminal for connection to a three-phase supply grid and output side first and second output-side single-phase transformer terminals. A converter arrangement has a first partial converter including a first input-side, single-phase AC voltage terminal for the first output-side transformer terminal and a first single-phase output terminal. A second partial converter has a second input-side single-phase AC voltage terminal for the second output-side transformer terminal and a second single-phase output connector. The partial converters are mutually connectable by the output terminals in an output-side series and/or parallel circuit and form a single-phase load terminal (Continued)

for the high-capacity load. A method for supplying power to a high-capacity load is also provided.

10 Claims, 8 Drawing Sheets

(51) Int. Cl.
  *H02M 5/14* (2006.01)
  *H02M 1/00* (2006.01)
  *H02M 5/275* (2006.01)
(52) U.S. Cl.
  CPC ........ *H02M 7/2173* (2013.01); *H02M 7/2176* (2013.01); *H02M 7/49* (2013.01)
(58) Field of Classification Search
  USPC ..................................................... 363/67–69
  See application file for complete search history.

(56) References Cited

U.S. PATENT DOCUMENTS

| | | | | |
|---|---|---|---|---|
| 6,016,262 | A * | 1/2000 | Karlsson | H02J 3/34 363/67 |
| 8,792,261 | B2 * | 7/2014 | Inoue | H02M 7/217 363/129 |
| 9,252,684 | B2 * | 2/2016 | Inoue | H02M 7/797 |
| 2014/0355321 | A1 * | 12/2014 | Akagi | H02M 7/497 363/131 |
| 2015/0122362 | A1 * | 5/2015 | Haugan | H02M 5/4585 138/33 |
| 2017/0302192 | A1 | 10/2017 | Hoerger et al. | |
| 2018/0076735 | A1 | 3/2018 | Bakran et al. | |

FOREIGN PATENT DOCUMENTS

| | | | | |
|---|---|---|---|---|
| WO | WO-2012130296 A1 * | 10/2012 | ............. | H02M 7/49 |
| WO | WO-2013108376 A1 * | 7/2013 | ............. | H02M 7/04 |
| WO | WO-2016023594 A1 * | 2/2016 | ............. | H02M 7/49 |
| WO | WO-2016045722 A1 * | 3/2016 | ............ | H02M 1/143 |
| WO | WO 2016045722 A1 | 3/2016 | | |
| WO | WO 2016155850 A1 | 10/2016 | | |
| WO | WO 2018091065 A1 | 5/2018 | | |

OTHER PUBLICATIONS

Hagiwara Makoto et al: "A battery energy storage system with a modular push-pull PWM converter", Energy Conversion Congress and Exposition; (ECCE), 2012 IEEE, IEEE, pp. 747-754, XP032467552, DOI: 10.1109/ECCE.2012.6342745; ISBN: 978-1-4673-0802-1; Abstract, Figures 5, 12, 13; 2012.

Shuguang Song et al: A Modular Multilevel Converter Based Railway Power Conditioner for Power Balance and Harmonic Compensation in Scott Railway Traction System, 2016 IEEE 8th International Power Electronics and Motion Control Conference.

Milovanovi Stefan et al: "MMC-based High Power DC-DC Converter Employing Scott Transformer", XP055565499, ISBN: 978-3-8007-4646-0; Found on the Internet: URL:https://ieeexplore.ieee.org/ielx7/8402798/8402799/08402846.pdf?tp=&arnumber=8402846&isnumber=8402799; [gefunden am Mar. 6, 2019]; Abstract, 1. Introduction and 2. Topology operating principles; Figures 1-3; pp. 227; Figure; 2018.

* cited by examiner

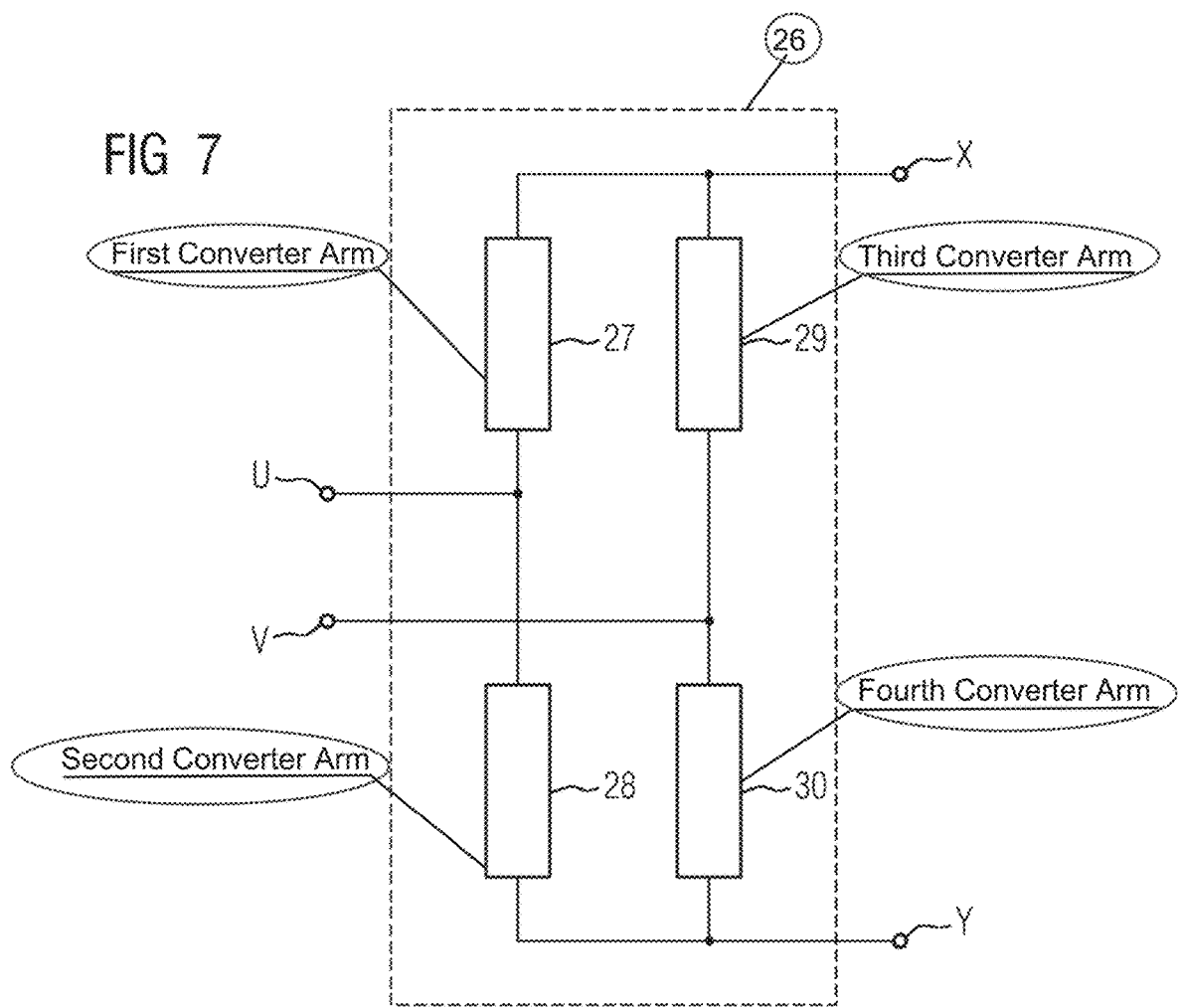
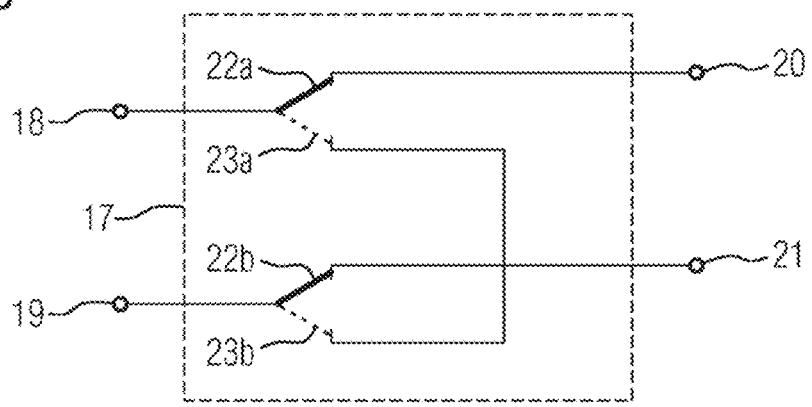

APPARATUS AND METHOD FOR SUPPLYING POWER TO A HIGH-CAPACITY LOAD

BACKGROUND OF THE INVENTION

Field of the Invention

The invention relates to an apparatus for supplying power to a high-capacity load.

A high-capacity load is particularly characterized in that, for the supply of the high-capacity load, a particularly high electrical capacity in excess of 10 MW is required. One example of a single-phase high-capacity load is a high-capacity arc furnace. A further example is an energy store for the grid stabilization of a supply grid.

It is known that three-phase modular multilevel power converters, which are known, for example, from WO 2016/155850 A1, can be employed for the generation of a high DC voltage from a three-phased AC grid. In loads having a low current demand but a high operating voltage, such as e.g. a particularly low-loss DC transmission system, a direct connection of a rail traction supply grid at a special frequency, or an arc-generating facility for a chemical process, the known modular multilevel power converters, in comparison with requirements, have an excessively high current-carrying capacity, such that high costs are prejudicial to the use thereof for the supply of single-phase high-capacity loads, on cost grounds.

A converter installation having a modular multilevel power converter for the conversion of a DC voltage into a three-phase AC voltage is known from EP 2 637 296 A1. Herein, the employment of a two-phase inverter is proposed, the output voltage of which is converted into a three-phase AC voltage by means of a two-to-three phase transformer.

In the paper "A Modular Multilevel Converter Based Railway Power Conditioner for Power Balance and Harmonic Compensation in Scott Railway Traction System" by Song et al., IEEE 2016, the employment of a Scott transformer in an installation for the compensation of harmonics or reactive currents, and for the balancing of active power for the supply of a rail traction power line, is described.

SUMMARY OF THE INVENTION

The object of the invention is the proposal of an apparatus of the abovementioned type, which is as cost-effective as possible, and permits the most reliable possible supply of a high-capacity load.

According to the invention, this object is fulfilled by a generic apparatus having a three-to-two phase transformer which comprises, on the input side, a three-phase transformer terminal for connection to a three-phase supply grid and, on the output side, a first output-side single-phase transformer terminal and a second output-side single-phase transformer terminal, and a converter arrangement having a first partial converter, which comprises a first input-side, single-phase AC voltage terminal for connection to the first output-side transformer terminal of the three-to-two phase transformer, and a first single-phase output terminal, and a second partial converter, which comprises a second input-side single-phase AC voltage terminal for connection to the second output-side transformer terminal of the three-to-two phase transformer, and a second single-phase output terminal, wherein the partial converters, by means of the output terminals, are able to be mutually connected in an output-side series and/or parallel circuit, and constituting a single-phase load terminal for connection to the high-capacity load. The single-phase terminals described herein are characterized as such, in that each single-phase terminal has two taps, which can be employed for connection to a further single-phase terminal, or to a two-pole, and thus also single-phase load. Accordingly, the apparatus according to the invention comprises a three-to-two phase transformer which, on the output side, is connectable to a three-phase electric power grid. The three-to-two phase transformer, on the output side, is connectable to a combination of two partial converters. The partial converters can be respectively configured to a single-phase or two-phase design. This advantageously results in a cost reduction, in comparison with the employment of a three-phase converter. Moreover, by means of the optionally series or parallel circuit of partial connectors on the output side, a reliable power supply can be delivered, both to high-capacity loads requiring a high load voltage, and to high-capacity loads requiring a high load current.

The three-to-two phase transformer is preferably a Scott transformer or a Leblanc transformer. These transformer types have proved to be particularly effective and reliable.

It can be advantageous if the apparatus additionally comprises a further transformer, which is connectable between the supply grid and the three-to-two phase transformer. By means of the further transformer, the grid voltage of the input-side AC voltage grid can be transformed into a lower voltage at the input of the three-to-two phase transformer.

In a particular embodiment, the partial converters are connected in series on the output side. The specification of the output-side series circuit of partial converters simplifies the design of the apparatus, which is particularly appropriate for the supply of a high-capacity load having a high load voltage.

In a differing embodiment, the partial converters are mutually connected in a parallel circuit on the output side. The specification of the output-side parallel circuit of partial converters again simplifies the design of the apparatus, which is thus particularly appropriate for the supply of a high-capacity load having a high load current.

According to one form of embodiment of the invention, the apparatus comprises a switching device wherein, by means of the switching device, the partial converters can optionally be connected in series or in parallel on the output side. The switching device can, for example, be arranged between the two partial converters. The switching device is appropriately configured to a four-pole design, such that it is simultaneously connectable to the output terminals of both partial converters. In this embodiment, the apparatus can be employed in a particularly flexible manner.

According to a further form of embodiment of the invention, the first partial converter comprises four converter arms, wherein a first converter arm extends between a first tap of the first input-side AC voltage terminal and a first tap of the first output terminal, a second converter arm extends between a first tap of the first input-side AC voltage terminal and a second tap of the first output terminal, a third converter arm extends between a second tap of the first input-side AC voltage terminal and a first tap of the first output terminal, and a fourth converter arm extends between a second tap of the first input-side AC voltage terminal and a second tap of the first output terminal, wherein the converter arms respectively comprise a series circuit of switching modules having semiconductor switches. Depending upon the configuration of the switching modules and the regulation or control thereof, the first partial converter, on the output side, can generally deliver an AC voltage or a DC voltage. The embodiment of the first partial converter in the form of a single-phase modular matrix converter or multilevel converter provides the option for the generation of particularly advantageous output voltages. It is correspondingly possible for the second partial converter also to be configured in the form of a single-phase modular matrix converter or multilevel converter. The first and second partial converters are appropriately of an identical design.

Appropriately, at least one, and preferably all of the switching modules comprise at least four interruptible semiconductor switches and an energy store, which are interconnected in a full-bridge circuit. Alternatively, or in combination herewith, at least one, and preferably all of the switching modules comprise at least two interruptible semiconductor switches and an energy store, which are interconnected in a half-bridge circuit. The full-bridge circuit provides an advantage, in that output voltages of both polarities (positive and negative) can be generated. A half-bridge circuit provides the advantage of lower losses. For the supply of a high-capacity load with a DC voltage or a direct current, for example, it is possible for only switching modules in the half-bridge circuit to be employed. This additionally reduces the costs of the apparatus.

The invention further relates to a method for supplying power to a high-capacity load.

A method of this type is disclosed, for example, in WO 2016/045722 A1.

The object of the invention is the proposal of a generic method, which is as reliable and as cost-effective as possible.

According to the invention, this object is fulfilled by a method for supplying power to a high-capacity load, wherein the high-capacity load is supplied with electrical energy by means of an apparatus according to the invention.

The advantages of the method according to the invention proceed specifically from the abovementioned advantages described in conjunction with the apparatus according to the invention.

The invention is further described hereinafter with reference to the exemplary embodiments represented in the figures.

BRIEF DESCRIPTION OF THE SEVERAL VIEWS OF THE DRAWING

FIG. 7 shows an example of a partial converter of the apparatus according to FIG. 1, in a schematic representation;

FIG. 8 shows an example of a switching device for the apparatus according to FIG. 1, in a schematic representation;

DETAILED DESCRIPTION OF THE INVENTION

Figure 1:
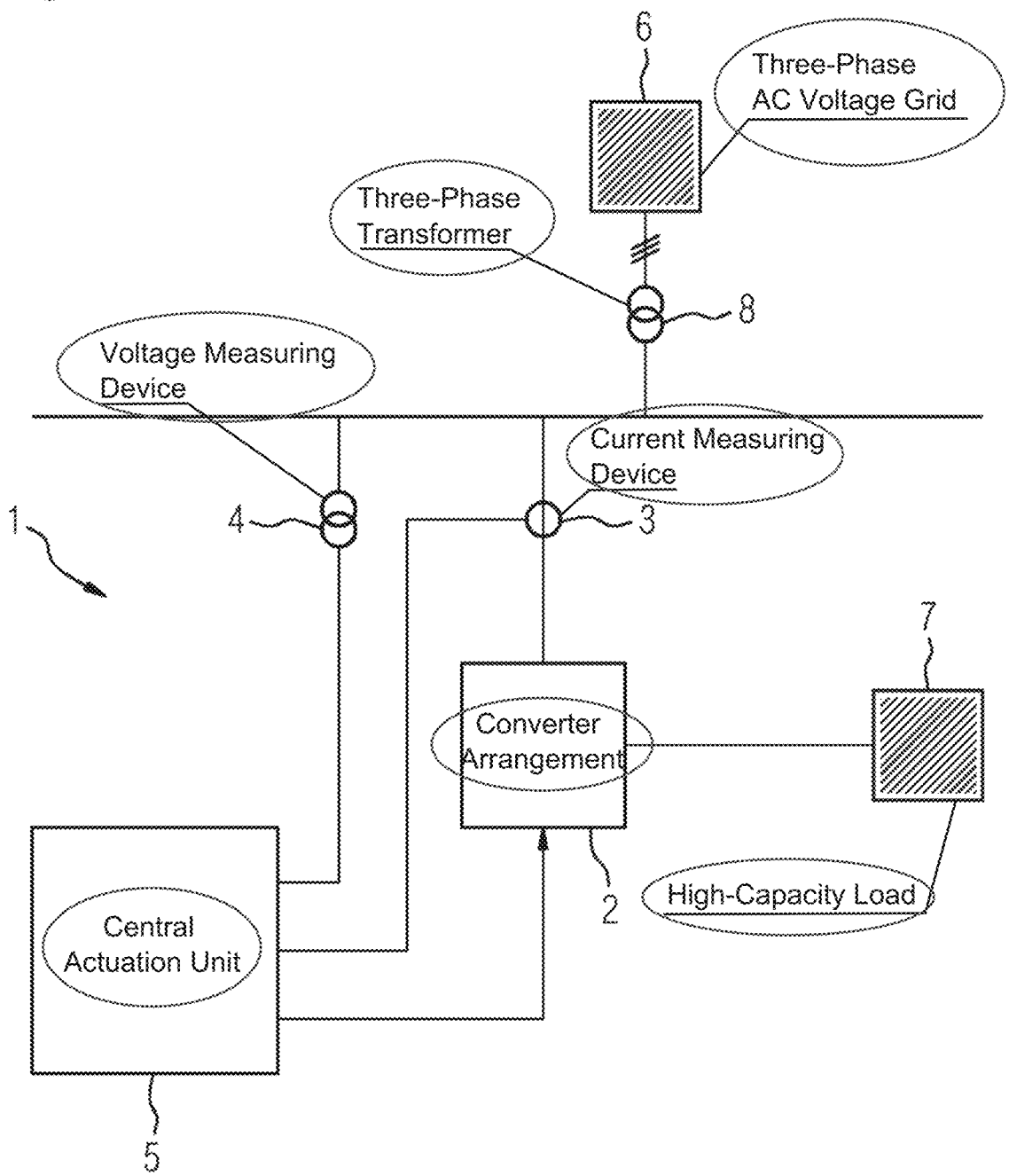
FIG. 1 shows an exemplary embodiment of an apparatus according to the invention, in a schematic representation.

FIG. 1 shows an apparatus 1 for supplying a high-capacity load 7 from a three-phase AC or power supply grid 6. The high-capacity load 7 can be, for example, a load, an electrical energy store or a further AC voltage grid.

Figure 2:
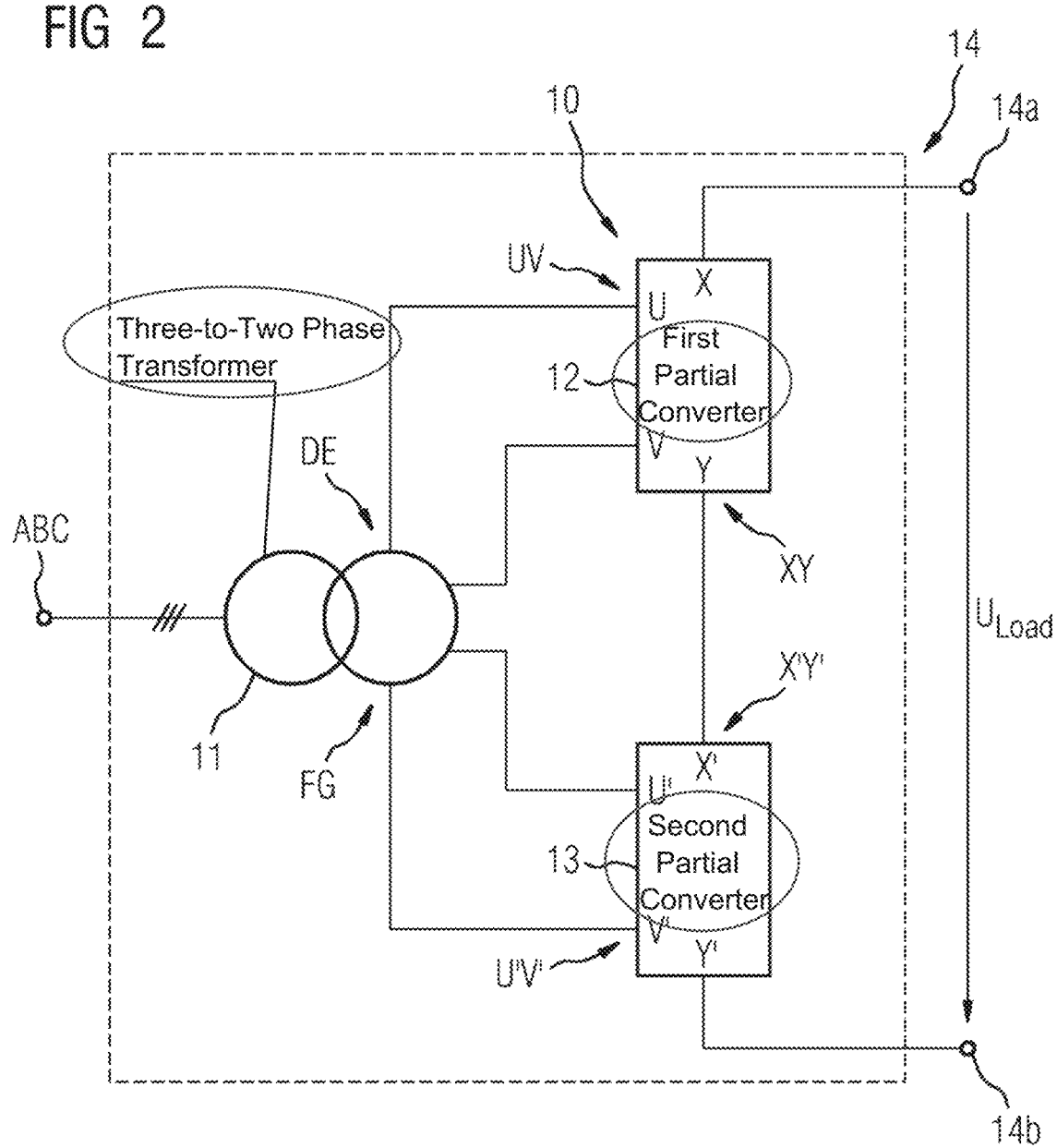
FIG. 2 shows a first example of an arrangement of partial converters for the apparatus according to FIG. 1, in a schematic representation.
Figure 3:
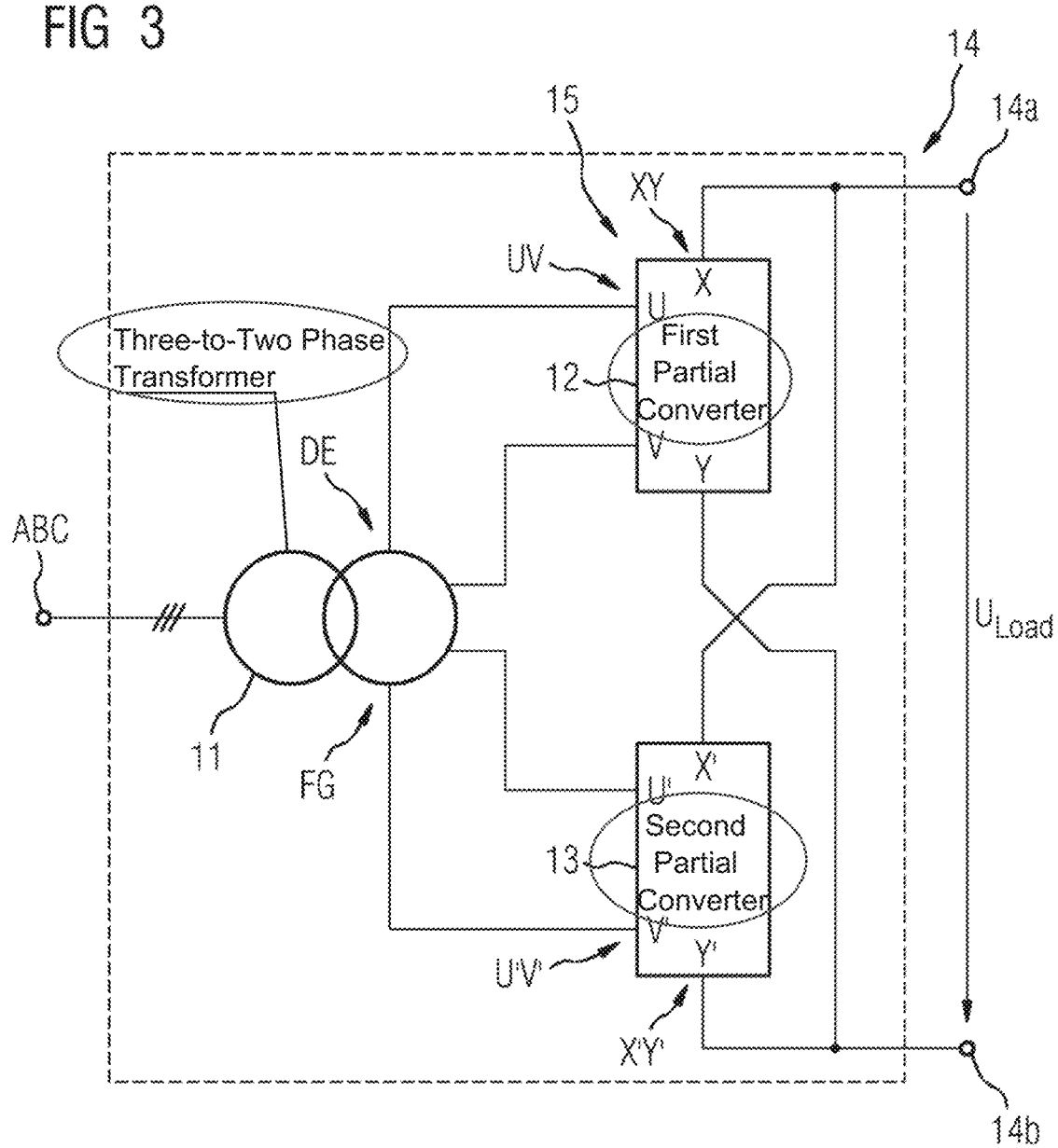
FIG. 3 shows a second example of an arrangement of partial converters for the apparatus according to FIG. 1, in a schematic representation.
Figure 4:
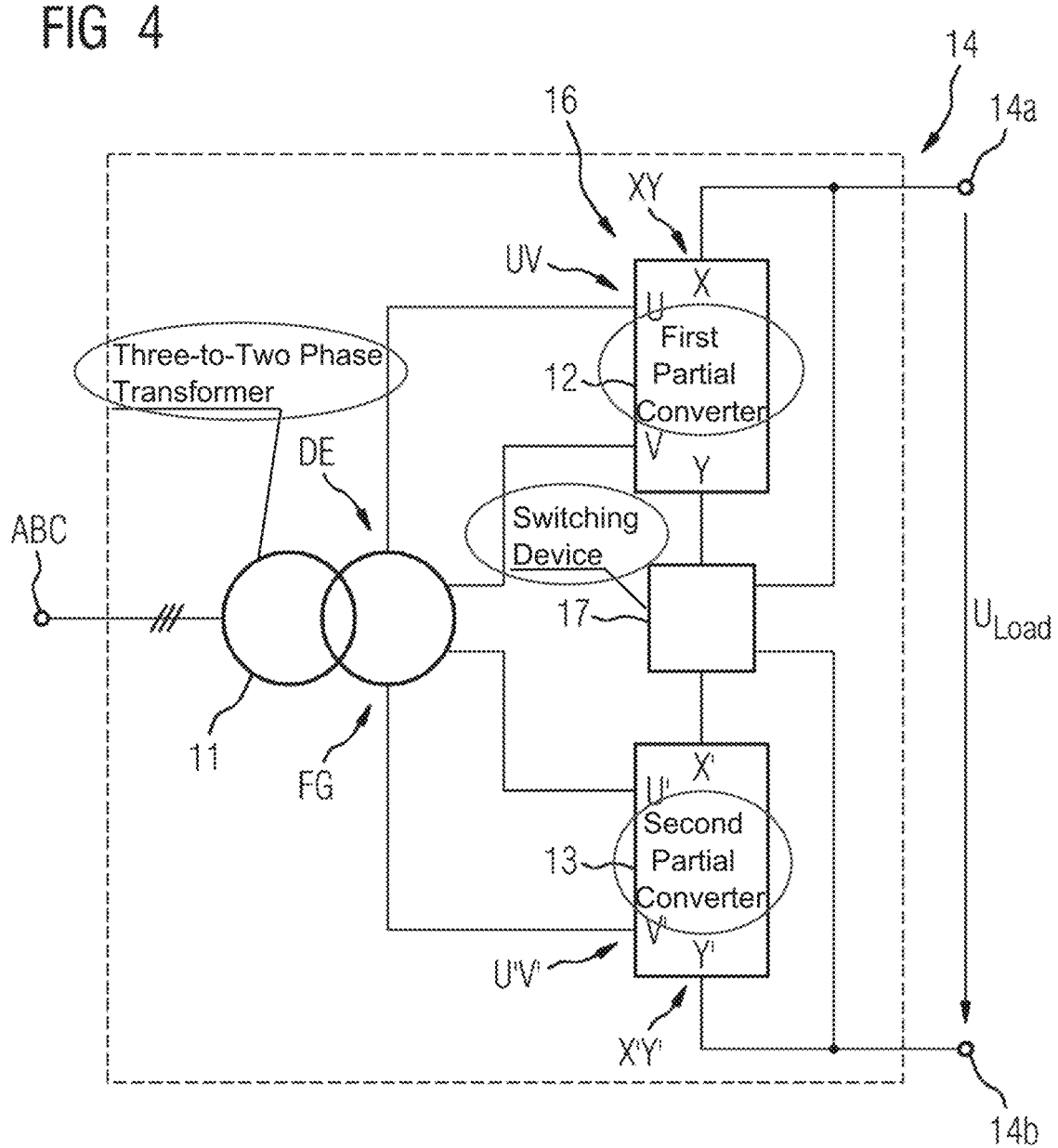
FIG. 4 shows a third example of an arrangement of partial converters for the apparatus according to FIG. 1, in a schematic representation.

The apparatus 1 comprises an arrangement 2 having a three-to-two phase transformer and a converter arrangement, the layout of which is addressed in greater detail in the subsequent FIGS. 2 to 4. The apparatus 1 further comprises a central actuation unit 5, by means of which the converter arrangement can be regulated or controlled. Control is executed in consideration of measured voltage and current values, which are detected by means of a voltage measuring device 4 and a current measuring device 3. A three-phase transformer 8 for the step-down transformation of the grid voltage of the AC voltage grid 6 is arranged between the arrangement 2 and the AC voltage grid 6.

FIG. 2 represents a converter arrangement 10 having a three-to-two phase transformer 11, which can be employed in the apparatus according to FIG. 1. The three-to-two phase transformer 11, on the input side, comprises a three-phase transformer terminal ABC for connection to the three-phase transformer 8, or for direct connection to the AC voltage grid 6 according to FIG. 1. The three-to-two phase transformer 11 further comprises a first output-side single-phase transformer terminal DE, and a second output-side single-phase transformer terminal FG.

The converter arrangement 10 comprises a first partial converter 12 and a second partial converter 13. The first partial converter 12 has a first input-side single-phase AC voltage terminal UV. The two taps of the AC voltage terminal UV are respectively designated as U and V. The second partial converter 13 has a second input-side single-phase AC voltage terminal U'V'. The two taps of the AC voltage terminal U'V' are respectively designated as U' and V'. The two input-side AC voltage terminals UV, U'V' are connected to the transformer terminals DE and FG which are assigned thereto. The first partial converter 12 further has a first single-phase output terminal XY having the taps X and Y. The second partial converter correspondingly has a second single-phase output terminal X'Y' having the taps X' and Y'. The two partial converters 12 and 13, on the output side, are mutually connected in a series circuit, wherein the second tap Y of the first output terminal XY is connected to the first tap X' of the second output terminal X'Y', and the first tap X of the first output terminal XY and the second tap Y' of the second output terminal X'Y' constitute a single-phase load terminal 14 for connection to the high-capacity load, having a first load terminal 14a and a second load terminal 14b. On the load terminal 14, a load voltage $U_{load}$ can be generated by means of the converter arrangement 10.

FIG. 3 represents a converter arrangement 15 having a three-to-two phase transformer 11, which can be employed in the apparatus 1 according to FIG. 1. The layout of the converter arrangement 15 substantially corresponds to that of the converter arrangement 10 according to FIG. 2. In FIGS. 2 to 4, identical and equivalent components are identified by the same reference symbols such that, hereinafter, only the differences between the examples according to FIGS. 2, 3 and 4 will be addressed in greater detail.

By way of distinction from the converter arrangement 10, the two partial converters 12 and 13 of the converter arrangement 15, on the output side, are mutually connected in a parallel circuit. The first load terminal 14a is constituted by the first tap X of the first output terminal XY, connected to the first tap X' of the second output terminal X'Y'. Correspondingly, the second load terminal 14b is constituted by the second tap Y of the first output terminal XY, connected to the second tap Y' of the second output terminal X'Y'.

FIG. 4 represents a converter arrangement 16 having a three-to-two phase transformer 11, which can be employed in the apparatus 1 according to FIG. 1. The layout of the converter arrangement 16 substantially corresponds to that of the converter arrangements 10 or 15 according to FIGS. 2 and 3.

By way of distinction from the converter arrangement 10 according to FIG. 2, the converter arrangement 16 comprises a switching device 17. By means of the switching device 17, the two partial converters 12 and 13 of the converter arrangement 16, on the output side, can optionally be mutually connected in a series or parallel circuit. The layout of the switching device 17 is addressed in greater detail in conjunction with the subsequent FIG. 8.

Figure 5:
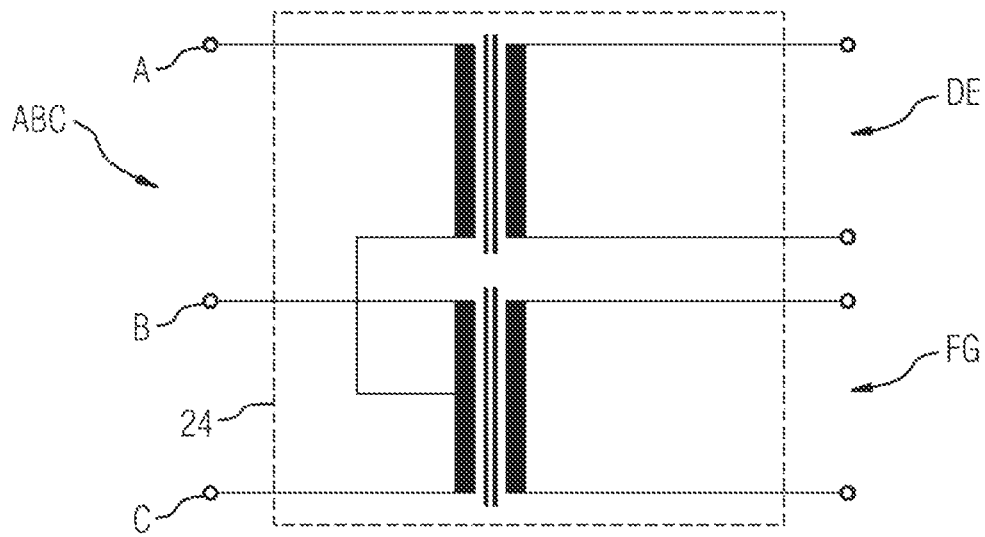
FIG. 5 shows a three-to-two phase transformer in a Scott circuit, in a schematic representation.

FIG. 5 represents a three-to-two phase transformer in the form of a Scott transformer 24. The input-side three-phase transformer terminal ABC and the two output-side single-phase transformer terminals DE and FG can be seen.

Figure 6:
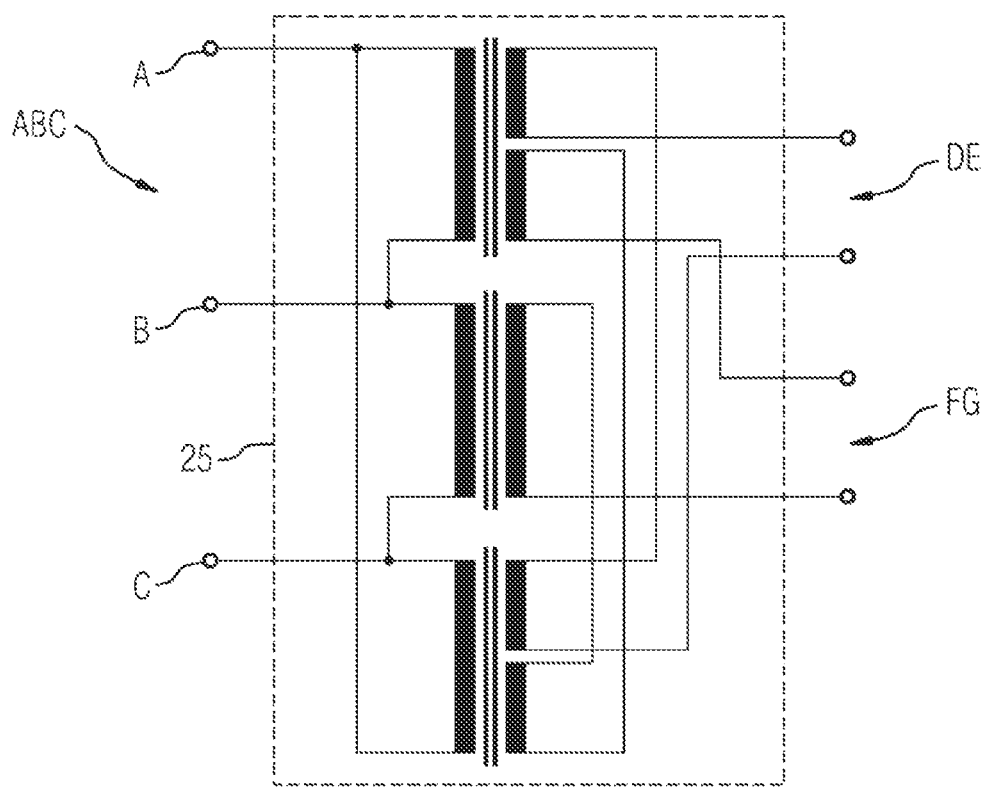
FIG. 6 shows a three-to-two phase transformer in a Leblanc circuit, in a schematic representation.

FIG. 6 represents a three-to-two phase transformer in the form of a Leblanc transformer 25. The input-side three-phase transformer terminal ABC and the two output-side single-phase transformer terminals DE and FG can be seen.

FIG. 7 shows a partial converter 26, which can be employed either as the first or as the second partial converter for one of the converter arrangements 10, 15, 16 according to FIGS. 2 to 4. The partial converter 26 comprises a first converter arm 27, a second converter arm 28, a third converter arm 29 and a fourth converter arm 30. Accordingly, the partial converter 26 is configured in the form of a single-phase matrix converter. The first converter arm 27 is arranged between the first tap U of the first input-side AC voltage terminal UV and the first tap X of the first output terminal XY, the second converter arm 28 is arranged between the first tap U of the first input-side AC voltage terminal UV and the second tap Y of the first output terminal, the third converter arm 29 is arranged between a second tap V of the first input-side AC voltage terminal UV and the first tap X of the first output terminal XY, and the fourth converter arm 30 is arranged between the second tap V of the first input-side AC voltage terminal UV and the second tap Y of the first output terminal XY. In the example represented, the converter arms 27 to 30 are configured identically. The layout thereof is addressed in greater detail in the subsequent FIG. 9.

FIG. 8 shows a switching device 17 for the converter arrangement 16 according to FIG. 4. The switching device is of the four-pole type, and can be connected by means of a first switching terminal 18 to the second tap Y of the first output terminal XY of the first partial converter 12, by means of a second switching terminal 19 to the first tap X' of the second output terminal X'Y' of the second partial converter 13, by means of a third switching terminal 20 to the first load tap 14a, and by means of a fourth switching terminal 21 to the second load tap 14b. In a first switching position, which is graphically represented in FIG. 8 by solid lines 22a,b, an output-side parallel circuit of the partial converters 12, 13 can be constituted. In a second switching position, which is graphically represented in FIG. 8 by broken lines 23a,b, an output-side series circuit of the partial converters 12, 13 can be constituted.

Figure 9:
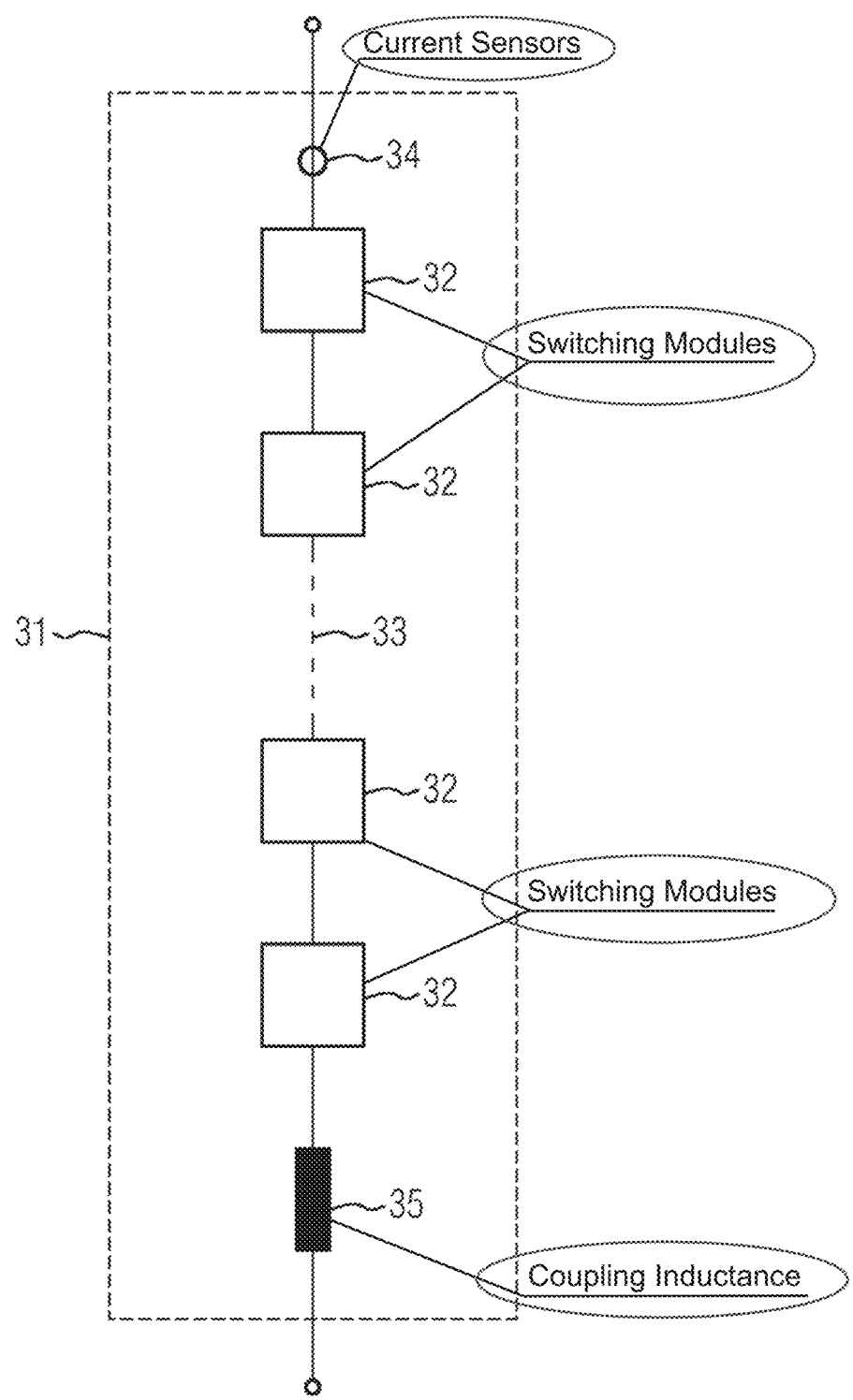
FIG. 9 shows an example of a converter arm for the partial converter according to FIG. 7, in a schematic representation.
Figure 10:
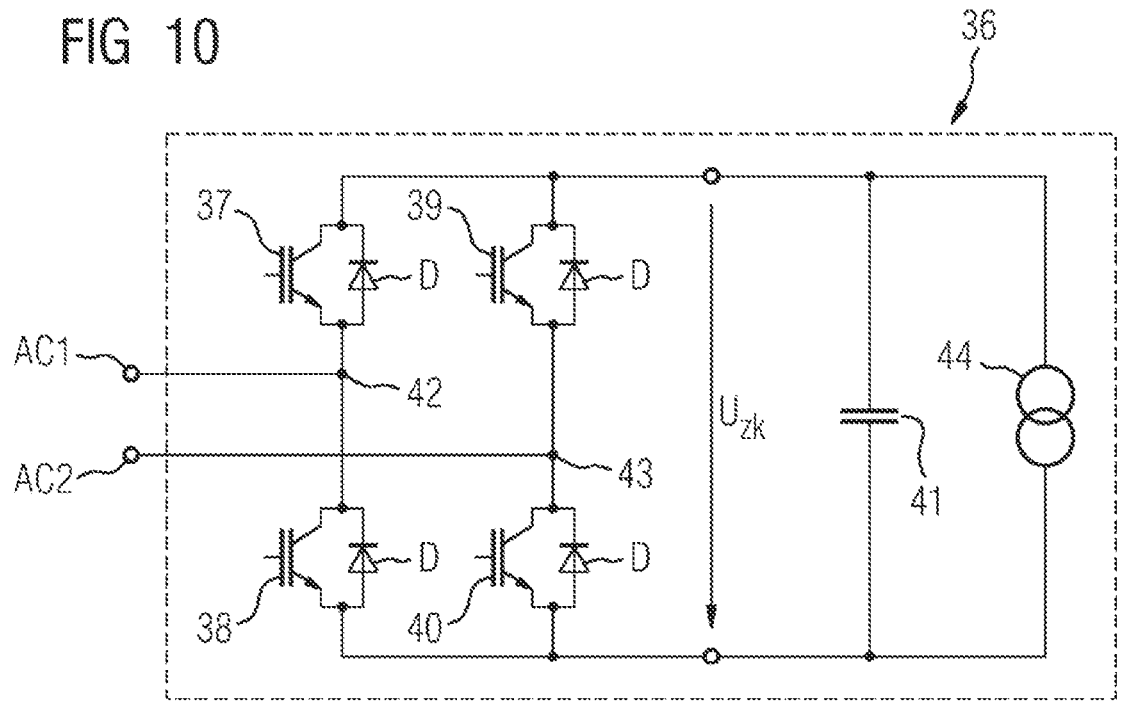
FIGS. 10 and 11 respectively show examples of switching modules for the converter arm according to FIG. 9, in a schematic representation.

FIG. 9 represents a converter arm 31, which can be employed as one of the converter arms 27 to 30 according to FIG. 7. The converter arm 27 comprises a series circuit of switching modules 32 which, in the example represented, are all of identical design, although this is not necessarily the case in general. In principle, the number of switching modules 32 employed is also arbitrary—this is represented in FIG. 9 by a broken line 33. The switching modules 32 comprise semiconductor switches and an energy store. These can be mutually connected, for example, in a half-bridge circuit or a full-bridge circuit. The layout of the switching modules is addressed in greater detail in the subsequent FIGS. 10 and 11.

The converter arm 31 further comprises a current sensor 34 for the detection of a current flowing in the converter arm 31, and a coupling inductance 35.

Figure 11:
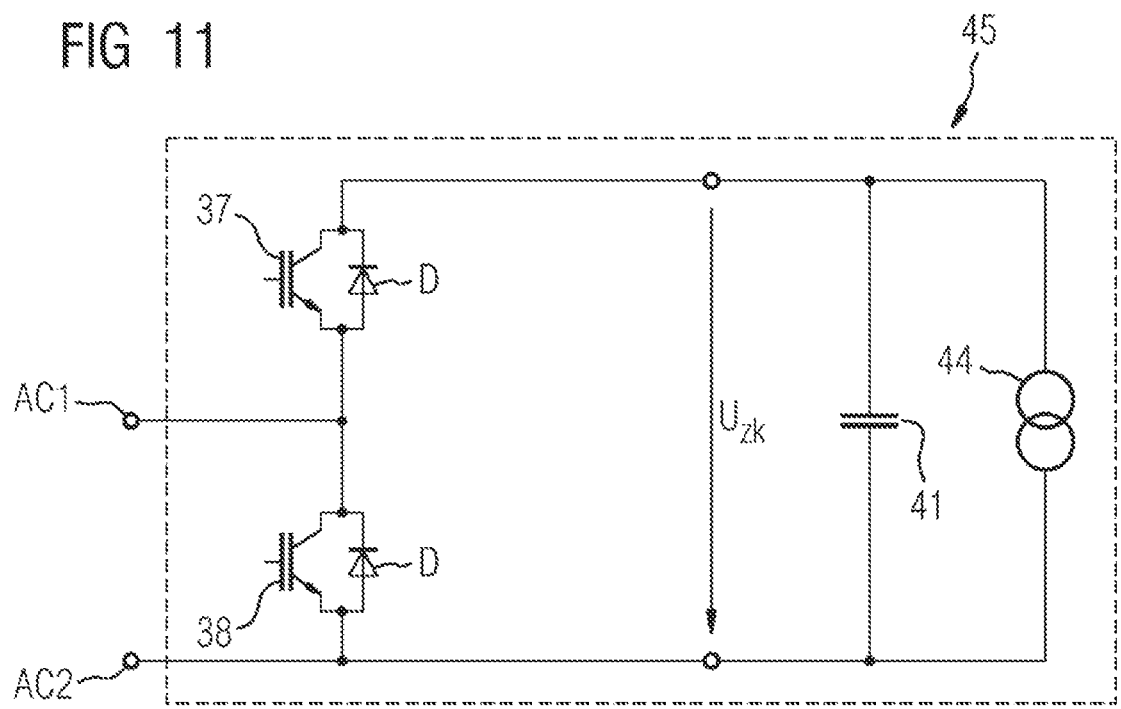

A switching module in a full-bridge circuit 36 for the converter arm 27 according to FIG. 9 is represented in FIG. 11. The full-bridge circuit 36 comprises a first semiconductor switch 37 and a second semiconductor switch 38, both in the form of IGBTs. The conducting direction of both semiconductor switches 37 and 38 is co-directional. The full-bridge circuit 36 further comprises a third semiconductor switch 39 and a fourth semiconductor switch 40, also both in the form of IGBTs. IGBTs can be replaced by other interruptible semiconductor switches. The conducting direction of both semiconductor switches 39 and 40 is co-directional. A switching module capacitor 41 is arranged in parallel with the two series circuits of the semiconductor switches. A first terminal AC1 is arranged at a potential point 42 between the semiconductor switches 37, 38, and a second terminal AC2 is arranged at a potential point 43 between the semiconductor switches 39, 40. A freewheeling diode D is connected in an antiparallel arrangement with each of the semiconductor switches 37-40. By the appropriate control of the semiconductor switches 37-40, a voltage across the terminals AC1,2 can be generated which corresponds to the voltage Uzk across the switching module capacitor 41, but of the opposite polarity to the voltage across the switching module capacitor 41 (−Uzk), or to the zero voltage. A voltage sensor 44 is further provided for detecting the voltage Uzk.

A switching module in a half-bridge circuit 45 for the converter arm 27 according to FIG. 9 is represented in FIG. 11. The half-bridge circuit 45 has two interruptible semiconductor switches 37, 38 (in the example represented, these are IGBT switches although, in general, other interruptible semiconductor switches, such as IGCTs or similar, can also be employed) and the energy store 41, wherein the semiconductor switches 37 and 38 are interconnected with the energy store 41 such that, at the output terminals AC1, 2 of the switching module, a voltage Uzk across the switching module capacitor 41 or a zero voltage can be generated. A voltage sensor 44 is further provided for detecting the voltage Uzk.

The invention claimed is:

1. An apparatus for supplying power to a high-capacity load, the apparatus comprising:
   a three-to-two phase transformer including an input side having a three-phase transformer terminal for connection to a three-phase supply grid, and an output side having a first output-side single-phase transformer terminal and a second output-side single-phase transformer terminal;

a converter arrangement having:
- a first partial converter, said first partial converter including a first input-side, single-phase AC voltage terminal for connection to said first output-side transformer terminal of said three-to-two phase transformer and said first partial converter including a first single-phase output terminal; and
- a second partial converter, said second partial converter including a second input-side single-phase AC voltage terminal for connection to said second output-side transformer terminal of said three-to-two phase transformer and said second partial converter including a second single-phase output terminal;
- said first and second single-phase output terminals of said first and second partial converters configured to be optionally interconnected in an output-side series circuit or an output-side parallel circuit to form a single-phase load terminal for delivering power both to high-capacity loads requiring a high load voltage and to high-capacity loads requiring a high load current.

2. The apparatus according to claim 1, wherein said three-to-two phase transformer is a Scott transformer or a Leblanc transformer.

3. The apparatus according to claim 1, which further comprises a further transformer configured to be connected between the supply grid and said three-to-two phase transformer.

4. The apparatus according to claim 1, wherein said partial converters have output sides connected in series.

5. The apparatus according to claim 1, wherein said partial converters have output sides connected in parallel.

6. The apparatus according to claim 1, wherein said partial converters have output sides, and a switching device is configured to optionally connect said partial converters in series or in parallel on said output side.

7. The apparatus according to claim 1, wherein:
- said first input-side, single-phase AC voltage terminal has first and second taps;
- said first single-phase output terminal has first and second taps;
- said first partial converter includes first, second, third and fourth converter arms;
- said first converter arm extends between said first tap of said first input-side, single-phase AC voltage terminal and said first tap of said first single-phase output terminal;
- said second converter arm extends between said first tap of said first input-side, single-phase AC voltage terminal and said second tap of said first single-phase output terminal;
- said third converter arm extends between said second tap of said first input-side, single-phase AC voltage terminal and said first tap of said first single-phase output terminal;
- said fourth converter arm extends between said second tap of said first input-side, single-phase AC voltage terminal and said second tap of said first single-phase output terminal; and
- said converter arms each include a respective series circuit of switching modules having semiconductor switches.

8. The apparatus according to claim 7, wherein at least one of said switching modules includes at least four interruptible semiconductor switches and an energy storage device interconnected in a full-bridge circuit.

9. The apparatus according to claim 7, wherein at least one of said switching modules includes at least two interruptible semiconductor switches and an energy storage device interconnected in a half-bridge circuit.

10. A method for supplying power to a high-capacity load, the method comprising supplying the high-capacity load with electrical energy by using the apparatus according to claim 1.

* * * * *